(12) United States Patent
Lessmann et al.

(10) Patent No.: US 9,388,269 B2
(45) Date of Patent: Jul. 12, 2016

(54) AMINO-FORMALDEHYDE RESINS AND APPLICATIONS THEREOF

(71) Applicant: Momentive Specialty Chemicals Inc., Stafford, TX (US)

(72) Inventors: Valter E. Lessmann, Curitiba (BR); Gilberto E. Saboia, Curitiba (BR); Cicero L. da Silva, Curitiba (BR); Edielma D. Chipanski, Curitiba (BR); David M. Harmon, Eugene, OR (US); Rajamani Nagarajan, Pearland, TX (US)

(73) Assignee: HEXION INC., Columbus, OH (US)

( * ) Notice: Subject to any disclaimer, the term of this patent is extended or adjusted under 35 U.S.C. 154(b) by 9 days.

(21) Appl. No.: 14/202,762

(22) Filed: Mar. 10, 2014

(65) Prior Publication Data

US 2014/0275353 A1 Sep. 18, 2014

Related U.S. Application Data

(60) Provisional application No. 61/790,923, filed on Mar. 15, 2013.

(51) Int. Cl.
| C08G 12/36 | (2006.01) |
| C08G 16/02 | (2006.01) |
| C08L 61/00 | (2006.01) |
| C08L 97/02 | (2006.01) |
| C08L 1/02 | (2006.01) |
| C08L 61/30 | (2006.01) |
| B32B 21/02 | (2006.01) |

(52) U.S. Cl.
CPC .............. *C08G 16/0256* (2013.01); *C08L 61/00* (2013.01); *C08L 97/02* (2013.01)

(58) Field of Classification Search
CPC ...................................................... C08G 12/36
USPC .................... 528/249, 254, 259, 503; 524/35; 428/502
See application file for complete search history.

(56) References Cited

U.S. PATENT DOCUMENTS

| 3,346,534 A | 10/1967 | Bills et al. |
| 3,351,615 A | 11/1967 | Gordon |
| 3,824,232 A | 7/1974 | Pusch et al. |
| 3,979,341 A | 9/1976 | Widmann |
| 4,183,832 A | 1/1980 | Meunier et al. |
| 4,745,200 A | 5/1988 | Moeller |
| 4,761,184 A | 8/1988 | Markessini |
| 5,191,069 A | 3/1993 | Roeschert et al. |
| 5,792,876 A | 8/1998 | Iwasaki et al. |
| 5,876,570 A | 3/1999 | Thigpen |
| 5,917,059 A | 6/1999 | Bruchmann et al. |
| 6,890,364 B2 | 5/2005 | Delfort et al. |
| 7,097,674 B2 | 8/2006 | Delfort et al. |
| 7,637,969 B2 | 12/2009 | Delgado Puche |
| 8,142,525 B2 | 3/2012 | Company et al. |
| 2009/0326166 A1 | 12/2009 | No et al. |
| 2010/0094027 A1 | 4/2010 | Coleman et al. |
| 2010/0105272 A1 | 4/2010 | Nandi et al. |

FOREIGN PATENT DOCUMENTS

| BR | PI0713161 | 2/2012 |
| DE | 1914209 A1 | 10/1970 |
| DE | 19648960 A1 | 5/1998 |
| EP | 0456073 B1 | 10/1995 |
| GB | 1225199 A | 3/1971 |
| JP | 57121017 A | 7/1982 |
| JP | 10195067 | 7/1998 |

OTHER PUBLICATIONS

Daignault et al., "2-CyclohexylOxyethanol", Organic Syntheses, Coll. (1973) vol. 5, p. 303.
Mar., Advanced Organic Chemistry: Reactions, Mechanisms, and Structure. McGraw-Hill, Inc., (1968) pp. 661-664.
Solomons, Organic Chemistry, Second Edition. John Wiley & Sons, New York, 1980, pp. 705-711.
Ragauskas et al. "Fast Curing of Composite Wood Products" Institute of Paper Science and Technology, Georgia Institutue of Technology, Award DE-FC36-01G010625, Apr. 26, 2006.

*Primary Examiner* — Duc Truong

(57) ABSTRACT

Amino-formaldehyde resins, articles of manufacture from the amino-formaldehyde resins, and processes for making the resins and articles are provided herein. In one embodiment, the amino-formaldehyde resins may be prepared using a reaction mixture including formaldehyde, a monohydroxy cyclic compound, and at least one amino compound selected from the group consisting of urea, melamine, and mixtures thereof. In another embodiment, the amino-formaldehyde resins are produced by reacting formaldehyde, a monohydroxy cyclic compound, and at least one amino compound selected from the group consisting of urea, melamine, and mixtures thereof, and the monohydroxy cyclic compound may be added as a front addition, an intermediate addition, a back addition, or a combination thereof, to the reaction mixture of formaldehyde and the at least one amino compound.

9 Claims, No Drawings

AMINO-FORMALDEHYDE RESINS AND APPLICATIONS THEREOF

RELATED APPLICATION DATA

This application claims benefit to U.S. Provisional Application No. 61/790,923, filed Mar. 15, 2013, of which the entire contents of the application are incorporated by reference herein.

BACKGROUND OF THE INVENTION

1. Field of the Invention

The present invention relates to amino-formaldehyde resins, processes for manufacturing amino-formaldehyde resins, and applications thereof. The present invention particularly relates to urea-formaldehyde resins, melamine formaldehyde resins, and melamine-urea-formaldehyde resins, processes for manufacturing the same, and applications thereof.

2. Background of the Art

Formaldehyde is one of the most common chemicals used in industry. International production was over 46 billion pounds in 2004, according to the International Agency for Research on Cancer (IARC). It is well known as a preservative in medical laboratories, as an embalming fluid, and as a sterilizer. Formaldehyde's primary use is in the production of resins and as a chemical intermediate. Urea-formaldehyde and phenol formaldehyde resins are used in foam insulations, as adhesives in the production of particleboard and plywood, and in the treating of textiles.

In the wood products industry, there is a growing concern over formaldehyde emissions. As a result many different reduced formaldehyde or non-formaldehyde adhesive systems have emerged. These systems generally include: (i) changing the reaction mixture of the formaldehyde adhesive resin; (ii) adding formaldehyde-scavenging materials directly to the formaldehyde resin; (iii) separately adding formaldehyde-scavenging materials to the wood furnish; (iv) treating panels after manufacture either with a formaldehyde scavenger or by applying coatings or laminates; and (v) changing to an entirely different adhesive system.

Unfortunately, in some of these systems, the bond strength and physical properties of composite boards are detrimentally affected. For example, lowering the mole ratio of urea-formaldehyde (UF) resins typically increases cure time and reduces the bond strength and physical properties of composite boards due to a reduction in the extent of cross-linking during curing.

Therefore, it would be desirable in the art of making amino-formaldehyde resins and articles of manufacture with reduced formaldehyde emissions without the detrimental effects on physical properties.

SUMMARY OF THE INVENTION

Embodiments of the invention are directed to amino-formaldehyde resins, articles of manufacture made from the amino-formaldehyde resins, and processes for making the resins and articles are provided herein.

In one aspect, an amino-formaldehyde resin is provided prepared comprising a reaction mixture including formaldehyde, a monohydroxy cyclic compound, and at least one amino compound selected from the group consisting of urea, melamine, and mixtures thereof. The monohydroxy cyclic compound may be a monohydroxy heterocyclic compound.

In another aspect, a process is provided for forming an amino-formaldehyde resin including reacting formaldehyde, a monohydroxy heterocyclic compound, and at least one amino compound selected from the group consisting of urea, melamine, and mixtures thereof, and the monohydroxy heterocyclic compound may be added as a front addition, an intermediate addition, a back addition, or a combination thereof, to the reaction mixture of formaldehyde and the at least one amino compound.

In another aspect, a process is provided for preparing an amino-formaldehyde resin comprising (a) adding formaldehyde, and at least one compound selected from the group consisting of urea, melamine, and mixtures thereof to a reaction vessel to form a reaction mixture, (b) adjusting the pH of the reaction mixture to a first pH level, (c) heating the reaction mixture to a first temperature and refluxing the reaction mixture, (d) adjusting the pH of the reaction mixture to a second pH level, (e) condensing the reaction mixture at a second temperature less than the first temperature, (f) adjusting the pH of the reaction mixture to a third pH level, and (g) adjusting the temperature to a third temperature less than the second temperature, wherein a monohydroxy cyclic compound is added at step (a), at step (e), after step (g), or a combination thereof.

In another aspect, an article of manufacture is provided including a substrate comprising cellulosic materials in a form selected from the group consisting of particles, strands, fibers, veneers, and mixtures thereof and an amino-formaldehyde resin prepared using a reaction mixture including formaldehyde, a monohydroxy heterocyclic compound, and at least one compound selected from the group consisting of urea, melamine, and mixtures thereof.

DESCRIPTION OF THE PREFERRED EMBODIMENTS

Embodiments of the invention are directed to amino-formaldehyde resins, articles of manufacture made from the amino-formaldehyde resins, and processes for making the resins and articles are provided herein. The amino-formaldehyde resins are made using a monohydroxy cyclic compound, such as a monohydroxy heterocyclic compound.

One embodiment of the invention is an amino-formaldehyde resin comprising the product of admixing formaldehyde, a monohydroxy cyclic compound, and at least one compound selected from the group consisting of urea, melamine, and mixtures thereof; under reaction conditions sufficient to prepare an amino-formaldehyde resin. For the purposes of the disclosure an amino-formaldehyde resin is one prepared with formaldehyde and an amino compound selected from the group of urea, melamine, or a combination thereof. The urea-formaldehyde resins are often referred to in the art as UF resins. The melamine-urea-formaldehyde resins are often referred to in the art as MUF resins. The melamine formaldehyde resins are commonly referred to in the art as MF resins.

In some embodiments, the amino-formaldehyde resins of the disclosure may be prepared using formalin which is, for the purposes of this disclosure, formaldehyde dissolved in water. While any concentration of formaldehyde known to be useful to those skilled in the art of preparing resins may be used in the formalin, a weight concentration of from about 30 to about 55 percent may be used because of its wide availability. In one embodiment, the formalin will have a concentration of about 35 weight percent. In another embodiment, the formalin will have a concentration of about 50 weight percent.

The amino-formaldehyde resins of the disclosure may be made with an amino compound selected from the group of urea, melamine, and combinations thereof. Amino-formaldehyde resins may be prepared with a formaldehyde (F) to amino compound (A) molar ratio (F:A) from about 2.5:1 to about 0.3:1, such as from about 1.4:1 to about 0.8:1, for example, about 1.1:1.

In some embodiments, urea is used as the amino compound to form the resin. The urea used in resin manufacture is handled as white solid granules and the urea used with some embodiments of the invention may have a purity of about 98 percent. The urea useful with the method of the disclosure may be any that is known to be useful to those of ordinary skill in the art of preparing amino-formaldehyde resins.

In other embodiments, the amino-formaldehyde resins of the disclosure that include urea may be prepared using formaldehyde in the form of a urea-formaldehyde concentrate. This concentrate may include, for example, about 60% formaldehyde and about 25% urea.

Amino-formaldehyde resins may be prepared with a formaldehyde (F) to urea (U) molar ratio (F:U) from about 2.5:1 to about 0.3:1, such as from about 1.4:1 to about 0.8:1, for example, about 1.1:1.

Some of the embodiments of the urea-formaldehyde resins of the disclosure are further prepared using melamine, a melamine-derivative, and combinations thereof. Melamine derivatives may include melamine esters, melamine condensates, and combinations thereof. The melamine grade may be any that is known to be useful to those of ordinary skill in the art of preparing amino-formaldehyde resins. For example, the melamine used with some embodiments of the invention may have a purity of about 99 percent. In some embodiments, the melamine may have a particle size small enough to ensure quick and complete dissolution. For example, in one such embodiment, the melamine may have a particle size of from about 50 to 400 microns.

Amino-formaldehyde-melamine resins may be prepared with a formaldehyde to urea (U) and melamine (M) molar ratio (F:(U+M)) from about 2.5:1 to about 0.3:1, such as from about 1.4:1 to about 0.8:1, for example, about 1.1:1.

Alternatively, the amino-formaldehyde resins of the disclosure that include melamine, and not urea, to form melamine-formaldehyde (MF) resins. Amino-formaldehyde resins may be prepared with a formaldehyde (F) to melamine (M) molar ratio (F:M) from about 2.5:1 to about 0.3:1, such as from about 1.4:1 to about 0.8:1, for example, about 1.1:1.

The amino-formaldehyde resins of the disclosure are formed using a monohydroxy cyclic compound. The monohydroxy cyclic compound may be used in preparing the amino-formaldehyde resins at an amount from about 0.5 weight percent (wt. %) to about 15 wt. %, such as from about 3 weight percent (wt. %) to about 10 wt. %, such as 3 wt. % or 6 wt. % of the amino-formaldehyde resin.

The monohydroxy cyclic compound may be a saturated or an unsaturated compound. The monohydroxy cyclic compound may be a monohydroxy heterocyclic compound, which may have one or more non-carbon atoms including oxygen and nitrogen among others.

In one embodiment of the invention, a monohydroxy cyclic compound is manufactured by reacting a carbonyl compound, such as an aldehyde, a ketone, or combinations thereof, with a triol having two hydroxyl groups located on adjacent carbon atoms or two hydroxyl groups located on two carbon atoms with one carbon between the two carbon atoms with the hydroxyl groups with a third hydroxyl functionality located on an additional carbon atom of the triol, in the presence of an acid catalyst. The reaction of aldehyde, ketone, or combinations thereof, with the triol described herein may produce a monohydroxy cyclic compound selected from the group of monohydroxy cyclical acetals, monohydroxy cyclical ketals, and combinations thereof.

The triol and aldehyde may be provided in a molar ratio of triol to aldehyde, ketone, or combinations thereof, from about 2:1 to about 0.5:1, for example about 1:1. It has been observed that an excess of triol to aldehyde, ketone, or combinations thereof may increase acetal or ketal formation. The reaction of the triol and the aldehyde may be performed under acidic conditions. The pH of the acidic conditions may be from about 0.5 to about 3.5.

The aldehyde may be any aldehyde compound having one or more aldehyde groups, and the aldehyde may have from 1 to 20 carbon atoms, such as from 1 to 7 carbon atoms. Examples of suitable aldehydes include formaldehyde, acetaldehyde, propionaldehyde, butyraldehyde, benzaldehyde, and combinations thereof. The aldehyde may be in the form of a solution, for example, as 35% to 55% of formaldehyde in water, or may be in the form of a solid, for example, paraformaldehyde.

In one embodiment the monohydroxy heterocyclic acetal compound is saturated and has one or more oxygen atoms with no other non-carbon atoms. One example of a monohydroxy heterocyclic acetal compound is glycerol formal, which is a mixture of isomers of 5-hydroxy-1,3-dioxane and 4-hydroxymethyl-1,3-dioxolane, CAS No. 99569-11-6, with the formula of $C_4H_8O_3$. For example, glycerol formal sold by Sigma-Aldrich discloses that glycerol formal comprises from about 33 wt. % to about 53 wt. % 4-hydroxymethyl-1,3-dioxolane and from about 47 wt. % to about 67 wt. % of 5-hydroxy-1,3-dioxane.

The ketones may be any ketone compound having one or more ketone groups, and the ketones may have from 1 to 20 carbon atoms, such as from 1 to 7 carbon atoms. Examples of suitable ketones include acetone, butanone, pentanone, hexanone, and combinations thereof. The ketone may be in the form of a solution or may be in the form of a solid.

The monohydroxy cyclic compound may be a monohydroxy heterocyclic ketal compound. The monohydroxy heterocyclic ketal compound may have one or more non-carbon atoms including oxygen and nitrogen among others, and which may be saturated or unsaturated. In one embodiment, a monohydroxy heterocyclic ketal compound is saturated and has one or more oxygen atoms with no other non-carbon atoms. One example of a monohydroxy heterocyclic ketal compound is solketal, which is 2,2-dimethyl-1,3-dioxolane-4-methanol, CAS No. 100-79-8, with the formula of $C_6H_{12}O_3$.

The triols described herein form cyclic acetals or ketals with aldehydes and ketones respectively. In one embodiment, the triols described herein may form dioxolanes and dioxanes from aldehydes or ketones. For example, glycerol, having a 1,2,3, hydroxyl compound having a 1,2 hydroxy functionality may be used to form glycerol formal that includes the isomers of dioxolane, 4-hydroxymethyl-1,3 dioxolane, and a dioxane, 5-hydroxy-1,3-dioxane.

Suitable triols having two hydroxyl groups located on adjacent carbon atoms or two hydroxyl groups located on two carbon atoms with one carbon between the two carbon atoms with the hydroxyl groups with a third hydroxyl functionality located on an additional carbon atom of the triol may have any number of carbon atoms. In one embodiment, the triol may have from 3 to 20 carbon atoms, such as from 3 to 7 carbon atoms. The triol may have, for example, at least a 1,2, hydroxy functionality, at least a 1,3 hydroxy functionality, at least a 2,3 hydroxy functionality, at least a 2,4 hydroxy functionality, at least a 3,4 hydroxy functionality, or at least a 3,5 hydroxy functionality, and a third hydroxyl functionality located on an additional carbon atom of the triol. Examples of suitable triols include glycerol, 1,2,4 butanol, and combinations thereof.

Triols may be in the form of several different purity grades including less purified grades available on the market derived from industrial production. For examples, industrially produced triols can be from about 60 wt. % up to about 100 wt. %. Triol compositions assaying at less than 100% may include non-triol organic matter, salts and combinations thereof. The non-triol organic matter, when present, may include aliphatic mono alcohols, polyalcohols, aldehydes, ketones, organic acids, lipids, and combinations thereof, among others. The non-triol organic matter, when present, may include from about 0.01 wt. % to about 5% of the composition. The salts, such as sodium chloride, may comprise from about 0.01 wt. % to about 10 wt. % of the composition.

Illustrative examples of suitable monohydroxy cyclic compounds may be selected from the group of glycerol formal, 2,2-dimethyl-1,3-dioxolane-4-methanol, and combinations thereof. The monohydroxy cyclic compound may be in the form of a substantially pure composition, such as 98% or greater monohydroxy cyclic compound.

Alternatively, the monohydroxy cyclic compound may be included in a composition having one or more additional materials. The monohydroxy cyclic compound-containing composition is added for reaction with the amino and aldehyde monomers described herein in the process described herein.

In one illustrative and non-restrictive embodiment, the monohydroxy cyclic compound-containing composition comprises the monohydroxy cyclic compound and one or more organic compounds. The one or more organic compounds include oxygen-containing compounds, and the oxygen-containing compounds are not monohydroxy cyclic compounds as described herein. The one or more organic compounds may comprise monohydroxy acyclic compounds, polyhydroxy compounds, dimers of the monohydroxy cyclic compound, aldehydes, ketones, organic acids, esters, ethers, and combinations thereof, among others. In one embodiment, the one or more organic compounds may comprise monohydroxy acyclic compounds, polyhydroxy compounds, dimers of the monohydroxy cyclic compound, and combinations thereof. Examples of monohydroxy acyclic compounds are acyclic linear or branched alcohols having 1-20 carbon atoms, such as methanol or ethanol. Examples of the polyhydroxy compounds include the triol reactant, among others. An example of dimers includes 5,5'-[methanediylbis (oxy)]bis(1,3-dioxane), 4,4'-[methanediylbis (oxymethanediyl)]bis(1,3-dioxolane), 5-[(1,3-dioxolan-4-ylmethoxy)methoxy]-1,3-dioxane, and combinations thereof, formed during a process to make glycerol formal. For example, the monohydroxy cyclic compound-containing composition may comprise glycerol formal, glycerol, and one or more compounds selected from the group of 5,5'-[methanediylbis(oxy)]bis(1,3-dioxane), 4,4'-[methanediylbis (oxymethanediyl)]bis(1,3-dioxolane), 5-[(1,3-dioxolan-4-ylmethoxy)methoxy]-1,3-dioxane, and combinations thereof.

The monohydroxy cyclic compound-containing composition may be formed from the reaction components used to form the monohydroxy cyclic compound. For example, glycerol formal may be made from the reaction of glycerol and formaldehyde in the present of an acid catalyst to form glycerol formal and dimers of glycerol formal. In another example, crude glycerin having about 60 wt. % to about 95 wt. %, such as about 80 wt. %, glycerol, which may further include hydroxyl-containing compounds, ketones, aldehydes, organic acids, lipids and combinations thereof, may be reacted with formaldehyde in the present of an acid catalyst to form glycerol formal, dimers of glycerol formal, and other compounds including acetals, ketal, alcohols, and other materials.

Also, some initial unreacted components from the monohydroxy cyclical compound process may be present in the final product. For example, a monohydroxy cyclic compound-containing composition made from the reaction of glycerol and formaldehyde in the present of an acid catalyst may include at least glycerol formal, glycerol, and dimers of glycerol formal. In one illustrative and non-restrictive example the monohydroxy cyclic compound-containing composition comprises 33 wt. % glycerol formal, 33 wt. % glycerol, and 33 wt. % dimers of glycerol formal.

In one embodiment, the amino-formaldehyde resins described herein may be prepared in the substantial absence of certain materials. For example, the resins may be prepared in the substantial absence or free of polyhydroxy compounds such as glycerol, ethylene glycol and polyalkylene glycols. The resins may be prepared in the substantial absence or free of acyclic monohydroxy compounds, such as methanol and ethanol. For the purposes of this disclosure, the term substantial absence means that any amount of the subject material present is at too low of a concentration to have a material effect upon the amino-formaldehyde resins and the products prepared therewith. Alternatively, the compositions and process described herein are free of polyhydroxy compounds and acyclic monohydroxy compounds.

Suitable acid catalysts may include, and are not limited to acids having a pKa from −3 to 2. Examples of acid catalysts may include sulfuric acid, sulfonic acid, para-toluenesulfonic acid, phosphoric acid, and combinations thereof, and derivatives thereof may be used. The acid catalyst may be added to a reaction mixture of the triol and carbonyl compound from about 1 wt. % to about 5 wt. % of the reaction mixture.

In the practice of the method of the invention, a reaction mixture including monohydroxy cyclic compound is used to prepare an amino-formaldehyde resin. The process, in some embodiments, may include two or more stages, a stage being defined a step during which at least one of formaldehyde, urea, and/or melamine is added to a reactor to prepare a resin. In some embodiments, the monohydroxy cyclic compound may be added in the first stage, also called a front addition, and carried through the process. In other embodiments, the monohydroxy cyclic compound may be added in a second stage, such as a condensation stage, known as condensation or intermediate addition. In other embodiments, the monohydroxy cyclic compound may be added in a subsequent stage to the first and second stage, and this addition is known as a back addition. In other embodiments, the monohydroxy cyclic compound may be added in at least two parts. One such addition is one where the monohydroxy cyclic compound is added in both a first and a second or other subsequent stage. This is known as a split addition.

It should be noted that there may be two types of molar ratios described in this disclosure; "cook" and "final". The cook molar ratio is the ratio of formaldehyde to amino compounds that is present during a condensation step. Typically, these reactants are, subject to stoichiometric limits, substantially all incorporated into a polymer. The final ratio includes both the reactants that were present during the condensation and any amino compounds that may have been added after the condensation. While these later added compounds may not be immediately incorporated into a polymer backbone, they are present within the resin and may, over time, "cure" into the polymer. For the purposes of the disclosure, the term cure means to interact with other compounds within a resin to produce a solid thermoset binding material. When all of the formaldehyde and amino compounds are present during a condensation reaction, the cook and final ratios will be the same. Unless otherwise stated, the ratios referenced in this application are "final" ratios. Exemplary processes of the disclosure for each type of amino-formaldehyde resin follow. These exemplary processes are illustrative but are not intended to limit the scope of the disclosure.

Urea-Formaldehyde Resins

In some embodiments of the invention, the amino-formaldehyde resin is prepared using urea. In these embodiments, the urea is present in the urea-formaldehyde (UF) resin in a molar ratio of formaldehyde to urea [F:U] from about 2.5:1 to about 0.3:1, such as from about 1.4:1 to about 0.8:1, for example, about 1.1:1.

The monohydroxy cyclic compound level of the reaction mixtures for the UF resins of the disclosure may be from about 0.5 percent to about 15 percent, such as from about 3 to about 10. For example, in one such embodiment, the monohydroxy cyclic compound may be present in an amount of about 3 percent, and in another embodiment the monohydroxy cyclic compound may be present in an amount of about 6 percent. The monohydroxy cyclic compound may be a monohydroxy heterocyclic compound. For example, the monohydroxy heterocyclic compound may be selected from the group of glycerol formal, 2,2-dimethyl-1,3-dioxolane-4-methanol, and combinations thereof.

In one embodiment, the amino-formaldehyde resin is prepared by a process comprising (a) adding formaldehyde, and at least one compound selected from the group consisting of urea, melamine, and mixtures thereof to a reaction vessel to form a reaction mixture, (b) adjusting the pH of the reaction mixture to a first pH level, (c) heating the reaction mixture to a first temperature, (d) adjusting the pH of the reaction mixture to a second pH level, (e) condensing the reaction mixture at a second temperature less than the first temperature, (f) adjusting the pH of the reaction mixture to an basic pH level, and (g) adjusting the temperature to a third temperature less than the second temperature, wherein a monohydroxy cyclic compound is added at step (a), at step (e), after step (g), or a combination thereof.

The monohydroxy cyclic compound modified UF resins of the disclosure may be prepared using any method known to be useful to those of ordinary skill in the art subject to the caveat that such method results in improvements over conventional reaction mixtures such as those demonstrated in the examples. In one embodiment of the method, the method is a front addition of the monohydroxy cyclic compound and includes the steps of:

1) Adding formaldehyde and water to a reactor with agitation.
2) Adjusting the reaction mixture to a first pH level with a base or an acid.
3) Adding the monohydroxy cyclic compound and urea to the reactor.
4) Heating the reactor to a first temperature, and maintaining the first temperature for an initial reaction time.
5) Adjusting the pH to a second pH level with a base or an acid.
6) Condensing to a target viscosity at a second temperature.
7) Adjusting the pH to a third pH level with a base and cooling to a third temperature.
8) Adding final urea, and optionally a catalyst, to a reactor and hold for subsequent reaction time.
9) Adjusting the pH to a fourth pH level with a base while cooling to a fourth temperature.

The first pH level may be a pH from about 2.5 to about 8.5, for example, pH 7.1±0.3. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art. Examples of suitable acids and acid salts include, and are not limited to, formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled in the art.

A base/buffering agent may be added with the formaldehyde. The base/buffering agent may be an organic base, such as an amine, for example, selected from a group of triethanolamine, diethanolamine, or combinations thereof. The base/buffering agent may be added in an amount from about 0.1 wt. % to about 5 wt. %, such as from about 0.3 wt. % to about 2 wt. %.

The reactor may be heated to a first temperature from about 40° C. to about 110° C., such as from about 50° C. to about 102° C., for example from about 99° C. to about 102° C. The initial reaction time may be from 0 to about 60 minutes, such as from about 0.1 to about 30 minutes, for example, about 10 minutes, and may be performed in a reflux process. Alternatively, the first temperature may be performed at a lower temperature than described for the first temperature herein as understood by one skilled in the art.

The second pH level may be a pH from about 2.5 to less than 7, for example, 5.7 ±0.1. The acid may be an inorganic acid and/or an organic acid, and may be a strong or weak acid. The acid may also be in the form of an acid salt. Examples of suitable acids and acid salts include, and not limited to formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled the art. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art.

The condensation reaction then occurs under the acidic conditions. For the condensation reaction, the temperature of the reaction mixture may be the same as the first temperature, or may be in part or in whole, at a second temperature less than the first temperature. The second temperature may be from about 40° C. to about 110° C., such as from about 50° C. to about 102° C., for example from about 95° C. to about 102° C.

The condensation reaction continues until a target viscosity is reached. The target viscosity may be from about 2 cps to about 3000 cps, such as from about 5 cps to about 1000 cps, for example, from about 15 cps to 500 cps.

The condensation reaction may be performed in two or more stages, with a temperature adjustment, component addition, for example, the monohydroxy cyclic compound, or addition change in processing parameters or components in between the stages. For such a process, the first stage may have a target viscosity of a first viscosity from about 2 cps to about 1,000 cps, such as from about 5 cps to about 1000 cps, for example, from about 15 cps to 500 cps, and a final stage target viscosity of a second viscosity that may be from about 2 cps to about 3,000 cps, such as from about 5 cps to about 1,000 cps, for example, from about 15 cps to 500 cps. In one embodiment, the second viscosity is greater than the first viscosity. In another embodiment, the first viscosity and the second viscosity are the same viscosity.

The third pH level may be from about 6.5 to about 8.5, for example, pH 7.5±0.3, and may be adjusted using a base and/or acid as described herein.

The temperature may be adjusted to a third temperature less than the second temperature. The third temperature may from about 90° C. to about −15° C., such as from about 60° C. to about 25° C., for example, from about 35° C. to about 15° C. The third temperature may be adjusted into steps, for examples at a first cooling period, 60° C., and at a second cooling period, at a temperature from about 35° C. to about 15° C.

An optional catalyst may be selected from the group consisting of sodium sulfate, magnesium sulfate, sodium chloride, others known to those skilled in the art, and combinations thereof. When present, the catalyst is provided in an amount from about 0.01 wt. % to about 10 wt. %, such as from about 0.5 wt. % to about 3 wt. %, for example, about 0.8 wt. %.

The fourth pH level is higher than the third pH level, and may be a pH from about 6.6 to about 8.6, for example, pH 7.8±0.2, and may be adjusted using a base or acid as described herein. The fourth temperature may be ambient temperature.

In one embodiment of the method, the method is a condensation or intermediate addition of the monohydroxy cyclic compound and includes the steps of:

1) Adding formaldehyde and water to a reactor with agitation.
2) Adjusting the reaction mixture to a first pH level with a base or an acid.
3) Adding urea to the reactor.
4) Heating the reactor to a first temperature, and maintaining the first temperature for an initial reaction time.
5) Adjusting the pH to a second pH level with a base or an acid.
6) Condensing to a first target viscosity.
7) Cooling the reaction mixture to a second temperature.
8) Adding the monohydroxy cyclic compound, and further condensing to a second target viscosity.
9) Adjusting the pH to a third pH level with a base or an acid.
10) Adding additional urea.
11) Cooling to a third temperature, optionally adding a catalyst to the reactor, and holding for subsequent reaction time.
12) Adding final urea.
13) Adjusting the pH to a fourth pH level with a base or an acid while cooling to a fourth temperature.

The first pH level may be a pH from about 2.5 to about 8.5, for example, pH 7.1±0.3. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art. Examples of suitable acids and acid salts include, and are not limited to formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled in the art.

A base/buffering agent may be added with the formaldehyde. The base/buffering agent may be an organic base, such as an amine, for example, selected from a group of triethanolamine, diethanolamine, or combinations thereof. The base/buffering agent may be added in an amount from about 0.1 wt. % to about 5 wt. %, such as from about 0.3 wt. % to about 2 wt. %.

The reactor may be heated to a first temperature from about 40° C. to about 110° C., such as from about 50° C. to about 102° C., for example from about 99° C. to about 102° C. The initial reaction time may be from 0 to about 60 minutes, such as from about 0.1 to about 30 minutes, for example, about 10 minutes, and may be performed in a reflux process. Alternatively, the first temperature may be performed at a lower temperature than described for the first temperature herein as understood by one skilled in the art.

The second pH level may be a pH from about 2.5 to less than 7, for example, 5.7±0.1. The acid may be an inorganic acid and/or an organic acid, and may be a strong or weak acid. The acid may also be in the form of an acid salt. Examples of suitable acids and acid salts include, and not limited to formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled in the art. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art.

The condensation reaction then occurs under the acidic conditions. For the condensation reaction, the temperature of the reaction mixture may be the same as the first temperature, or may be in part or in whole, at a second temperature less than the first temperature. The second temperature may be from about 40° C. to about 110° C., such as from about 50° C. to about 102° C., for example from about 95° C. to about 102° C.

The condensation reaction continues until a target viscosity is reached. The target viscosity may be from about 2 cps to about 3,000 cps, such as from about 5 cps to about 1,000 cps, for example, from about 15 cps to 500 cps.

The condensation reaction may be performed in two or more stages, with a temperature adjustment, component addition, for example, the monohydroxy cyclic compound, or addition change in processing parameters or components in between the stages. For such a process, the first stage may have a target viscosity of a first viscosity from about 2 cps to about 1,000 cps, such as from about 5 cps to about 1000 cps, for example, from about 15 cps to 500 cps, and a final stage target viscosity of a second viscosity that may be from about 2 cps to about 3,000 cps, such as from about 5 cps to about 1,000 cps, for example, from about 15 cps to 500 cps. In one embodiment, the second viscosity is greater than the first viscosity. In another embodiment, the first viscosity and the second viscosity are the same viscosity.

The third pH level may be from about 6.5 to about 8.5, for example, pH 7.5±0.3, and may be adjusted using a base and/or acid as described herein.

The temperature may be adjusted to a third temperature less than the second temperature. The second temperature may from about 90° C. to about 15° C., such as from about 60° C. to about 25° C., for example, from about 35° C. to about 15° C. The third temperature may be adjusted into steps, for examples at a first cooling period, 60° C., and at a second cooling period, at a temperature from about 35° C. to about 15° C.

An optional catalyst may be selected from the group consisting of sodium sulfate, magnesium sulfate, sodium chloride, others known to those skilled in the art, and combinations thereof. When present, the catalyst is provided in an amount from about 0.01 wt. % to about 10 wt. %, such as from about 0.5 wt. % to about 3 wt. %, for example, about 0.8 wt. %.

The fourth pH level is higher than the third pH level, and may be in the range from about 6.6 to about 8.6, for example, pH 7.8±0.2, and may be adjusted using a base or acid as described herein. The fourth temperature may be ambient temperature.

In another embodiment of the method, the method is a back addition of the monohydroxy cyclic compound and includes the steps of:
1) Adding formaldehyde and water to a reactor with or without agitation.
2) Adjusting the reaction mixture to a first pH level with a base or an acid.
3) Adding urea to the reactor.
4) Heating the reactor to a first temperature, and maintaining the first temperature for an initial reaction time.
5) Adjusting the pH to a second pH level with a base or an acid.
6) Condensing to a first target viscosity.
7) Cooling the reaction mixture to a second temperature.
8) Adding additional urea.
9) Adjusting the pH to a third pH level with a base or an acid.
10) Further condensing to a second target viscosity.
11) Adjusting the pH to a third pH level with a base or an acid and cooling to a third temperature.
12) Adding final urea.
13) Optionally adding a catalyst to the reactor.
14) Adding the monohydroxy cyclic compound.
15) Adjusting the pH to a fourth pH level with a base while cooling to a fourth temperature.

The first pH level may be a pH from about 2.5 to about 8.5, for example, pH 7.1±0.3. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art. Examples of suitable acids and acid salts include, and are not limited to, formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled in the art.

A base/buffering agent may be added with the formaldehyde. The base/buffering agent may be an organic base, such as an amine, for example, selected from a group of triethanolamine, diethanolamine, or combinations thereof. The base/buffering agent may be added in an amount from about 0.1 wt. % to about 5 wt. %, such as from about 0.3 wt. % to about 2 wt. %.

The reactor may be heated to a first temperature from about 40° C. to about 110° C., such as from about 50° C. to about 102° C., for example from about 99° C. to about 102° C. The initial reaction time may be from 0 to about 60 minutes, such as from about 0.1 to about 30 minutes, for example, about 10 minutes, and may be performed in a reflux process. Alternatively, the first temperature may be performed at a lower temperature than described for the first temperature herein as understood by one skilled in the art.

The second pH level may be a pH from about 2.5 to less than 7, for example, 5.7 ±0.1. The acid may be an inorganic acid and/or an organic acid, and may be a strong or weak acid. The acid may also be in the form of an acid salt. Examples of suitable acids and acid salts include, and not limited to formic acid, sulfuric acid, ammonium sulfate, ammonium chloride, and combinations thereof. The acid may be provided in a solution, for example, such as a 10% formic acid solution. The acid may be added in any amount, and is added in the amount necessary to achieve the second pH level as understood by one skilled in the art. Examples of suitable bases include, and are not limited to, sodium hydroxide, potassium hydroxide, magnesium hydroxide, calcium hydroxide, triethanolamine, and combinations thereof. The base may be provided in a solution, such as a 25% sodium hydroxide solution. The base may be added in any amount, and is added in the amount necessary to achieve the first pH level as understood by one skilled in the art.

The condensation reaction then occurs under the acidic conditions. For the condensation reaction, the temperature of the reaction mixture may be the same as the first temperature, or may be in part or in whole, at a second temperature less than the first temperature. The second temperature may be from about 40° C. to about 110° C., such as from about 50° C. to about 102° C., for example from about 95° C. to about 102° C.

The condensation reaction continues until a target viscosity is reached. The target viscosity may be from about 2 cps to about 3,000 cps, such as from about 5 cps to about 1,000 cps, for example, from about 15 cps to 500 cps.

The condensation reaction may be performed in two or more stages, with a temperature adjustment, component addition, for example, the monohydroxy cyclic compound, or addition change in processing parameters or components in between the stages. For such a process, the first stage may have a target viscosity of a first viscosity from about 2 cps to about 1,000 cps, such as from about 5 cps to about 1000 cps, for example, from about 15 cps to 500 cps, and a final stage target viscosity of a second viscosity that may be from about 2 cps to about 3,000 cps, such as from about 5 cps to about 1,000 cps, for example, from about 15 cps to 500 cps. In one embodiment, the second viscosity is greater than the first viscosity. In another embodiment, the first viscosity and the second viscosity are the same viscosity.

The third pH level may be a pH from about 6.5 to about 8.5, for example, pH 7.5 ±0.3, and may be adjusted using a base or and acid as described herein.

The temperature may be adjusted to a third temperature less than the second temperature. The second temperature may from about 90° C. to about 15° C., such as from about 60° C. to about 25° C., for example, from about 35° C. to about 15° C. The third temperature may be adjusted into steps, for examples at a first cooling period, 60° C., and at a second cooling period, at a temperature from about 35° C. to about 15° C.

The final urea is added, and an optional catalyst may be selected from the group consisting of sodium sulfate, magnesium sulfate, sodium chloride, others known to those skilled in the art, and combinations thereof. When present, the catalyst is provided in an amount from about 0.1 wt. % to about 10 wt. %, such as from about 0.5 wt. % to about 3 wt. %, for example, about 0.8 wt. %.

The fourth pH level may be a pH from about 6.5 to about 8.5, for example, pH 7.8 ±0.2, and may be adjusted using a base or acid as described herein. The fourth temperature may be ambient temperature.

Alternatively, melamine-formaldehyde resins may be prepared using the same processes described for urea-formaldehyde resins with melamine being substituted for urea during the urea additions.

In the embodiments of the melamine-urea-formaldehyde (MUF) resins, the melamine and urea are present in a molar ratio of formaldehyde to melamine and urea (F:(M+U)) from about 2.5:1 to about 0.3:1, such as from about 1.4:1 to about 0.8:1, for example, about 1.1:1. The amount of melamine in MUF resins comprises from about 0.1 to less than 4 wt. % melamine of the total resin weight. The melamine is added with the urea in one or more of the urea addition steps.

The products prepared using these resins have improved physical and mechanical properties as compared to products prepared using otherwise conventional reaction mixtures as shown in the Examples below.

Applications

The amino-formaldehyde resins of the disclosure are particularly useful in preparing articles of manufacture where the amino-formaldehyde resins function to bind or adhere substrates together. For example, in one embodiment of the invention, the substrates comprise cellulosic materials and may be in a form of particles, strands, fibers, veneers, and mixtures thereof.

For example, the UF and MUF of the disclosure may be used as the primary binders used for interior-grade wood composite boards such as particleboard (PB), hardwood plywood (HWPW), and medium density fiberboard (MDF). The articles of manufacture may be prepared using any method known to be useful to those of ordinary skill in the art. For example, particleboard may be prepared using the methods disclosed in U.S. Pat. No. 4,482,699 to Williams, the entire contents of which is incorporated herein by reference.

Further, the amino-formaldehyde resins of the disclosure may be prepared including additives useful for their final applications. For example, in one embodiment, the resins may include a mold release agent. Other additives useful with the amino-formaldehyde resins of the disclosure include buffering agents, internal catalysts, tack modifiers, flow modifiers, and fire retardants.

EXAMPLES

The following examples are provided to illustrate the present invention. The examples are not intended to limit the scope of the present invention and they should not be so interpreted. Amounts are in weight parts or weight percentages unless otherwise indicated.

Example 1

Comparable Example

UF resins were synthesized using a multi-stage process. In a first stage, formaldehyde, water, and a base/buffer agent TEA (triethanolamine) were added into a reactor. Then, a first amount of urea (I) was added into the reactor and a temperature was raised to 99-102° C. The reaction mixture's pH was adjusted to 7.1±0.3 using 25% sodium hydroxide. The urea and formaldehyde were reacted an F:U mole ratio of about 2.1:1. The reaction mixture was refluxed for 10 minutes.

In the second stage, the pH was adjusted to 5.6±0.1 using 10% formic acid. The second stage is the condensation reaction and included allowing the reaction mixture to reach a Gardner-Holt (G-H) viscosity of "H" (about 200 cps), then cooling the reaction mixture to 90° C., and allowing the reaction mixture to reach an final Gardner-Holt (G-H) viscosity of "RS" (from about 470 cps to 500 cps). The condensation reaction was ended by increasing the pH to about 7.5±0.2 using 25% sodium hydroxide.

In the third stage, a second amount of urea (II) was added and the temperature was maintained at about 90° C. for 10 minutes.

In a fourth stage, the reaction mixture was cooled to about 35° C. to about 37° C. and sodium sulfate was added to the reactor. A third amount of urea (III) was then added to the reactor. The final (F:U) mole ratio was about 1.13:1. The pH was then adjusted to about 7.8±0.2 using 25% sodium hydroxide. The resin synthesis was completed by cooling the batch to a room temperature.

The resin components were added in the following quantities as shown in Table 1.

TABLE 1

| Component | Quantity, wt. % Sample 1 |
|---|---|
| 53% Formaldehyde | 50.911 |
| Water | 0.083 |
| Triethanolamine (TEA) | 0.094 |
| Urea (I) | 25.698 |
| Formic Acid (10%) | 0.078 |
| Sodium Hydroxide (25%) | 0.025 |
| Urea (II) | 12.849 |
| Sodium Sulfate | 1.052 |
| Urea (III) | 9.210 |
| Total | 100.000 |

Example 2

Front Addition

Monohydroxy cyclic compound modified UF resins were synthesized using a multi-stage process. In a first stage, formaldehyde, water, and a base/buffer agent TEA (triethanolamine) were added into a reactor. A monohydroxy heterocyclic compound, glycerol formal, was added. Then, the first urea (I) was added into the reactor and a temperature was raised to about 99° C. to about 102° C. The reaction mixture's pH was adjusted to 7.1±0.3 using 25% sodium hydroxide. The urea and formaldehyde were reacted an F:U mole ratio of about 2.1:1. The reaction mixture was refluxed for 10 minutes.

In the second stage, the pH was adjusted to 5.6±0.1 using 10% formic acid. The second stage is the condensation reaction and included allowing the reaction mixture to reach a Gardner-Holt (G-H) viscosity of "H" (about 200 cps), then cooling the reaction mixture to 90° C., and allowing the reaction mixture to reach an final Gardner-Holt (G-H) viscosity of "RS" (from about 470 cps to 500 cps). The condensation reaction was ended by increasing the pH to about 7.5±0.2 using 25% sodium hydroxide.

In the third stage, urea was added and the temperature was maintained at about 90° C. for 10 minutes.

In a fourth stage, the reaction mixture was cooled to about 35° C. to about 37° C. and sodium sulfate was added to the reactor. Urea was then added to the reactor. The final (F:U) mole ratio was about 1.13:1. The pH was then adjusted to about 7.8±0.2 using 25% sodium hydroxide. The resin synthesis was completed by cooling the batch to a room temperature.

This resin synthesis process was performed with two different amounts of monohydroxy heterocyclic compounds. The resin components were added in the following quantities as shown in Table 2.

TABLE 2

| Component | Quantity, wt. % Sample 2 | Quantity, wt. % Sample 3 |
|---|---|---|
| 53% Formaldehyde | 47.700 | 49.222 |
| Water | 0.976 | 0.384 |
| Triethanolamine (TEA) | 0.094 | 0.094 |
| Glycerol Formal | 6.000 | 3.000 |
| Urea (I) | 24.000 | 24.800 |
| Formic Acid (10%) | 0.078 | 0.078 |
| Sodium Hydroxide (25%) | 0.050 | 0.050 |
| Urea (II) | 12.000 | 12.500 |
| Sodium Sulfate | 1.052 | 1.052 |
| Urea (III) | 8.750 | 8.820 |
| Total | 100.000 | 100.000 |

Example 3

Intermediate or Condensation Addition

Monohydroxy cyclic compound modified UF resins were synthesized using a multi-stage process. In a first stage, formaldehyde, water, and a base/buffer agent TEA (triethanolamine) were added into a reactor. Then, the first urea (I) was added into the reactor and a temperature was raised to about 99° C. to about 102° C. The reaction mixture's pH was adjusted to 7.1±0.3 using 25% sodium hydroxide. The urea and formaldehyde were reacted an F:U mole ratio of about 2.1:1. The reaction mixture was refluxed for 10 minutes.

In the second stage, the pH was adjusted to 5.6±0.1 using 10% formic acid. The second stage is the condensation reaction and included allowing the reaction mixture to reach a Gardner-Holt (G-H) viscosity of "E-F" (about 120 cps to about 140 cps), then cooling the reaction mixture to 90° C. A monohydroxy heterocyclic compound, glycerol formal, was added. The reaction mixture was further condensed to reach a final Gardner-Holt (G-H) viscosity of "RS" (from about 470 cps to 500 cps). The condensation reaction was ended by increasing the pH to about 7.5±0.2 using 25% sodium hydroxide.

In the third stage, urea was added and the temperature was maintained at about 90° C. for 10 minutes.

In a fourth stage, the reaction mixture was cooled to about 35° C. to about 37° C. and sodium sulfate was added to the reactor. Urea was then added to the reactor. The final (F:U) mole ratio was about 1.13:1. The pH was then adjusted to about 7.8±0.2 using 25% sodium hydroxide. The resin synthesis was completed by cooling the batch to a room temperature.

This resin synthesis process was performed with two different amounts of monohydroxy heterocyclic compounds. The resin components were added in the following quantities as shown in Table 3.

TABLE 3

| Component | Quantity, wt. % Sample 4 | Quantity, wt. % Sample 5 |
|---|---|---|
| 53% Formaldehyde | 47.700 | 49.220 |
| Water | 0.976 | 0.386 |
| Triethanolamine (TEA) | 0.094 | 0.094 |
| Urea (I) | 24.000 | 24.800 |
| Formic Acid (10%) | 0.078 | 0.078 |
| Glycerol Formal | 6.000 | 3.000 |
| Sodium Hydroxide (25%) | 0.050 | 0.050 |
| Urea (II) | 12.000 | 12.500 |
| Sodium Sulfate | 1.052 | 1.052 |
| Urea (III) | 8.750 | 8.820 |
| Total | 100.00 | 100.00 |

Example 4

Back Addition

UF resins were synthesized using a multi-stage process as described in Example 1. Then a monohydroxy heterocyclic compound, glycerol formal and water was added.

The resin components were added in the following quantities as shown in Table 4.

TABLE 4

| Component | Quantity, wt. % Sample 6 | Quantity, wt. % Sample 7 |
|---|---|---|
| Urea-formaldehyde Resin | 91.179 | 95.522 |
| Glycerol Formal | 5.820 | 2.954 |
| Water | 3.001 | 1.523 |
| Total | 100.000 | 100.000 |

Similar samples were created for resins with glycerol formal concentrations of 10 wt. % and 15 wt. %. Additionally, similar resins were formed with the back addition using glycerin in place of glycerol formal, and at concentrations of 3 wt. %, 10 wt. %, and 15 wt. %. A comparison of the surface tensions resins from Example 1 and Example 4, both glycerol formal (GF) and glycerin (GN) are shown in Table 5.

TABLE 5

| Sample description | Surface Tension (mN/m) |
|---|---|
| Example 1: Sample 1 | 56.50 |
| Example 4: Sample 6 (3% GF resin) | 49.15 |
| 10% GF resin | 38.98 |
| 15% GF resin | 36.69 |
| 3% GN resin | 55.34 |
| 10% GN resin | 51.10 |
| 15% GN resin | 51.22 |

As shown in Table 5, the surface tensions of the glycerol formal modified urea-formaldehyde resins are less than the control resin, Example 1: Sample 1, and the equivalent glycerin modified urea-formaldehyde resins.

Example 5

Resins produced as described above in Example 4 were used to form homogenous medium density fiberboard (MDF). Medite fiber was used to make the MDF boards. The resin was added at about 10 wt. % based on oven-dry wood weight of the board.

The medium density fiberboards were prepared at the conditions set forth in Table 6. The detailed MDF manufacturing procedures are as follows. The wood fibers were blended with the resins using a laboratory scale, blowline-simulator blender. The resinated fibers were weighed and air-felted into a vacuum forming box to obtain homogeneous mats. The mat was pressed in a hot press to reach to the target thickness of 0.68 inch. The finished boards were cooled to room temperature and equilibrated to desired moisture content of 8%. The conditioned boards were trimmed to 12 inch by 12 inch, sanded, and cut for internal bond (IB), modulus of rupture (MOR) and modulus of elasticity (MOE) test samples. The sample sizes and testing for IB, MOR and MOE were according to the American Society for Testing and Materials (ASTM) Standard D 1037, Volume 4.09—Wood. Twelve IB specimens and two MOR and MOE samples per condition were tested with an Instron Tensile Test machine. The results are reported in Table 7.

TABLE 6

Medium-density fiberboard manufacturing:

Furnish: western softwoods
Furnish MC: 11.4%
Mat moisture contents: 9.0-9.5%
Blending time: 24 minutes
Catalyst: 1% (as 25% solution) based on Non-Volatile resin
Wax: 0.35% White Emulsion wax [58A] based on oven-dry wood weight
Resin contents: 10% based on oven dry wood weight
Mat dimensions: 14.625 inch × 14.625 inch × 0.68 inch
Target board density: 45 lb/ft$^3$
Press temperature: 330° F.
Press cycle: 30-230-20 (closing time to a target thickness - time at a target thickness-degas time)
Testing:

Internal bond strength test: eight 2" × 2" samples per panel
Bending test (MOR and MOE): two 2" × 12" samples per panel - modulus of rupture (MOR), modulus of elasticity (MOE)
Formaldehyde emission: two 3.4" × 6.7" samples per reaction mixture The test results for Table 6 as shown in Table 7 below.

TABLE 7

| | Urea-Formaldehyde Resins | | | | | | |
|---|---|---|---|---|---|---|---|
| | IB | | | MOR | | Formaldehyde Emission | |
| | Resin Additive | | | | | | |
| Wt. % | Density lb/ft$^3$ | IB psi | IB at 45 lb/ft$^3$ psi | Density lb/ft$^3$ | MOR psi | Density lb/ft$^3$ | FE ppm |
| Example 1: Sample 1 0% GF additive | 45.87 | 57.7 | 60.8 | 46.04 | 3974 | 45.87 | 0.522 |
| Example 4: Sample 6 (3% GF resin) | 46.66 | 75.7 | 67.1 | 46.80 | 4362 | 46.58 | 0.375 |
| 10% GF resin | 46.88 | 79.1 | 70.4 | 46.80 | 4487 | 46.51 | 0.761 |
| 15% GF resin | 46.19 | 85.9 | 76.0 | 46.13 | 4703 | 45.88 | 0.927 |
| 3% GN resin | 46.34 | 75.9 | 71.1 | 46.41 | 4579 | 46.22 | 0.653 |
| 10% GN resin | 47.83 | 82.0 | 74.9 | 47.29 | 4917 | 48.30 | 0.557 |
| 15% GN resin | 46.57 | 69.2 | 55.9 | 46.44 | 4433 | 46.48 | 0.641 |

The MDF study results show that all monohydroxy cyclic compound modified UF resins exhibited improved internal bond (IB) strength compared to the control UF resins, in view of the density variations. The MDF study results also show that the monohydroxy cyclic compound-modified UF resin exhibited improved internal bond (IB) strength and modulus of rupture (MOR) strength compared to the glycerin modified UF resins, considering the density variations. It was also observed that the resin surface tension decreased with the increase of glycerol formal modified resins content.

The MDF study also indicated that for the glycerol formal modified resins, the internal bond strength value increased with the increase of glycerol formal content. At 10% level, the glycerol formal and glycerin modified resins also demonstrated similar internal bond strength, however, panels made by glycerin modified resins had significantly higher board density. At 15% level, glycerol formal modified resins demonstrated much higher internal bond strength than glycerin modified resins.

The MDF study results show that all monohydroxy cyclic compound modified UF resins exhibited improved modulus of rupture (MOR) strength compared to the control UF resins. It was also observed that the modulus of rupture increased with the increase of glycerol formal in the resin.

In summary, the addition of glycerol formal to the UF resin increased both internal bond strength and modulus of rupture strength of the resulting MDF board. Both internal bond strength and modulus of rupture strength increased with the increase of glycerol formal content in the resin. Glycerol formal and glycerin modified resins demonstrated similar MDF properties improvements when their content was lower than 10%. At 15% level, glycerol formal modified resins demonstrated much higher board properties improvement than glycerin modified resins.

Example 6

Similar boards were produced as shown in Example 5 using the resins made in Examples 1-4. The formed boards were tested for internal bond (IB) strength, modulus of rupture (MOR) and modulus of elasticity (MOE). The respective results are shown in Table 8 below.

TABLE 8

| Urea-Formaldehyde Resins with Additive (wt. %) | IB (psi) | MOR (psi) | MOE (psi) |
|---|---|---|---|
| Example 1: Sample 1 0% GF additive | 34.8 | 2819 | 287167 |
| Front end add: Sample 2 (3% GF resin) | 50.8 | 3201 | 287143 |
| Front end add: Sample 3 (6% GF resin) | 61.5 | 3706 | 323812 |
| Intermediate add: Sample 4 (3% GF resin) | 62.8 | 3595 | 310918 |
| Intermediate add: Sample 5 (6% GF resin) | 65.6 | 3736 | 329335 |
| Back end add: Sample 6 (3% GF resin) | 50 | 3187 | 289861 |
| Back end add: Sample 7 (6% GF resin) | 50.2 | 3250 | 285201 |

While the present invention has been described and illustrated by reference to particular embodiments, those of ordinary skill in the art will appreciate that the invention lends itself to variations not necessarily illustrated herein.

What is claimed is:

1. An amino-formaldehyde resin prepared using a reaction mixture comprising:
   formaldehyde;

a monohydroxy cyclic compound selected from the group of monohydroxy cyclical acetals, monohydroxy cyclical ketals, and combinations thereof; and at least one amino compound selected from the group consisting of urea, melamine, and mixtures thereof.

2. The amino-formaldehyde resin of claim 1, wherein the monohydroxy cyclic compound is a monohydroxy heterocyclic compound.

3. The amino-formaldehyde resin of claim 2, wherein the monohydroxy cyclic compound is selected from the group of glycerol formal, 2,2-dimethyl-1,3-dioxolane-4-methanol, and combinations thereof.

4. The amino-formaldehyde resin of claim 1, wherein the monohydroxy cyclic compound is present at a concentration from about 0.5 to about 15 weight percent of the reaction mixture.

5. The amino-formaldehyde resin of claim 1, wherein the reaction mixture further comprises one or more organic compounds.

6. The amino-formaldehyde resin of claim 1, wherein the amino-formaldehyde resin is an urea-formaldehyde resin, a melamine-formaldehyde resin, a melamineurea-formaldehyde resin, or a combinations thereof.

7. The amino-formaldehyde resin of claim 1, wherein the amino-formaldehyde resin has surface tension from about 35 mN/m to about 50 mN/m.

8. The amino-formaldehyde resin of claim 1 wherein the amino-formaldehyde resin is prepared by introducing the monohydroxy cyclic compound using a back addition, a front addition, an intermediate addition, or combinations thereof.

9. The amino-formaldehyde resin of claim 1 wherein the monohydroxy cyclic compound is formed by reacting an aldehyde, a ketone, or combinations thereof, with a triol having at least two hydroxyl groups located on adjacent carbon atoms or two hydroxyl groups located on two carbon atoms with one carbon between the two carbon atoms with the hydroxyl groups.

* * * * *